US008638733B2

United States Patent
Lee et al.

(10) Patent No.: US 8,638,733 B2
(45) Date of Patent: Jan. 28, 2014

(54) APPARATUS AND METHOD FOR ESTIMATING MAP SIZE IN A BROADBAND WIRELESS COMMUNICATION SYSTEM

(75) Inventors: Hee-Kwang Lee, Anyang-si (KR);
Choong-Chae Woo, Seongnam-si (KR);
Seung-Joo Maeng, Seongnam-si (KR);
Jae-Ho Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 12/704,984

(22) Filed: Feb. 12, 2010

(65) Prior Publication Data
US 2010/0202395 A1    Aug. 12, 2010

(30) Foreign Application Priority Data

Feb. 12, 2009   (KR) .................. 10-2009-0011284

(51) Int. Cl.
*H04W 4/00* (2009.01)
*H04J 3/00* (2006.01)
(52) U.S. Cl.
USPC ........................... 370/329; 370/330; 370/336
(58) Field of Classification Search
None
See application file for complete search history.

(56) References Cited

U.S. PATENT DOCUMENTS

| 2006/0203711 | A1* | 9/2006 | Oh et al. ................. 370/208 |
| 2008/0034107 | A1* | 2/2008 | Lee et al. ................. 709/232 |
| 2008/0075027 | A1 | 3/2008 | Lee et al. |
| 2009/0245172 | A1* | 10/2009 | Sato ......................... 370/328 |
| 2009/0313515 | A1* | 12/2009 | Barve ....................... 714/748 |
| 2010/0214992 | A1* | 8/2010 | Hart et al. ................. 370/329 |

FOREIGN PATENT DOCUMENTS

JP      2008-86018 A    4/2008

\* cited by examiner

*Primary Examiner* — Derrick Ferris
*Assistant Examiner* — Kodzovi Acolatse
(74) *Attorney, Agent, or Firm* — Jefferson IP Law, LLP

(57) ABSTRACT

An apparatus and method for estimating a MAP size in a broadband wireless communication system based on FFR are provided. In the method, one of a plurality of connections is selected according to priority between the connections. An available resource condition and a MAP size for allocation of resources for the selected connection is determined if resources acceptable for a burst are present in a zone including the selected connection. The next connection is selected according to the priority if available resources are present. The determined MAP size is determined as the final estimation value of a MAP size if the available resources are not present.

27 Claims, 9 Drawing Sheets

APPARATUS AND METHOD FOR ESTIMATING MAP SIZE IN A BROADBAND WIRELESS COMMUNICATION SYSTEM

PRIORITY

This application claims the benefit under 35 U.S.C. §119(a) of a Korean patent application filed in the Korean Intellectual Property Office on Feb. 12, 2009 and assigned Serial No. 10-2009-0011284, the entire disclosure of which is hereby incorporated by reference.

BACKGROUND OF THE INVENTION

1. Field of the Invention

Aspects of the present invention relate generally to a broadband wireless communication system. More particularly, aspects of the present invention relate to an apparatus and method for estimating the size of a MAP for transmission of resource allocation information in a broadband wireless communication system.

2. Description of the Related Art

The fourth-generation (4G) communication systems (i.e., the next-generation communication systems) are intended to provide users with various Qualities of Services (QoS) with a data rate of about 100 Mbps. The 4 G communication systems are evolving to provide high mobility and high QoS in Broadband Wireless Access (BWA) communication systems, such as Local Area Network (LAN) systems and Metropolitan Area Network (MAN) systems. Typical examples of these communication systems are identified in the Institute of Electrical and Electronics Engineers (IEEE) 802.16 system standards.

The IEEE 802.16-based broadband wireless communication system uses an Orthogonal Frequency Division Multiple Access (OFDMA) scheme to provide broadband transmission. The OFDMA scheme uses a plurality of orthogonal subcarriers to transmit data. The OFDMA scheme is robust against multipath fading and has high spectral efficiency, thus providing high throughput in high-rate data transmission. Generally, the broadband wireless communication system groups all orthogonal subcarriers into subchannels. The broadband wireless communication system also performs communication on a frame basis. A Base Station (BS) may transmit a MAP message including information about data bursts allocated in each frame, and a user terminal may decode the MAP message to detect the burst allocation state.

The broadband wireless communication system may use a frequency reuse pattern of 1 or N (>1). If the frequency reuse pattern is 1, all cells may use all subchannels in common. In this case, the spectral efficiency may increase, but the reception performance of a user terminal may degrade due to the co-channel interference between adjacent cells if the user terminal is located at a cell boundary. On the other hand, if the frequency reuse pattern is 2 or more, adjacent cells may use different subchannels. In this case, the reception performance of a user terminal may improve, but the spectral efficiency may decrease. Thus, applying a frequency reuse pattern of 1 to user terminals with good reception environments is necessary to increase the spectral efficiency, and applying a frequency reuse pattern of N (>1) to user terminals located at cell boundaries is necessary to reduce the interference between adjacent cells. What is therefore needed is a scheme for applying the frequency reuse pattern flexibly according to the reception environments of user terminals.

The base station also specifies data burst allocation information of a user terminal in a downlink (DL) MAP region of a DL frame. A plurality of time slots are used to allocate the data bursts in the DL data period. The BWA communication system standard (i.e., the IEEE 802.16 spec) specifies that the base station records resource allocation information in a MAP region with a fixed size when allocating DL resources. In other words, the base station uses a fixed number of DL MAP Information Elements (IEs) to determine the size of a data burst allocation region and the number of data bursts to be allocated, thus degrading the resource utilization and efficiency.

SUMMARY OF THE INVENTION

Aspects of the present invention address at least the above-mentioned problems and/or disadvantages and to provide at least the advantages described below. Accordingly, an aspect of the present invention is to provide an apparatus and a method for estimating a MAP size for a Fractional Frequency Reuse (FFR) operation in a broadband wireless communication system.

Another aspect of the present invention is to provide an apparatus and method for estimating a MAP size and the number of data bursts when a segmented nonHARQ data burst, a segmented HARQ data burst, a nonsegmented non-HARQ data burst, and a nonsegmented HARQ data burst are simultaneously allocated in one frame in a broadband wireless communication system.

In accordance with an aspect of the present invention, a method for estimating a MAP size in a broadband wireless communication system based on FFR is provided. The method includes selecting one of a plurality of connections according to priority between the connections, determining an available resource condition and a MAP size for allocation of resources for the selected connection, if resources acceptable for a burst are present in a zone including the selected connection, selecting the next connection according to the priority if available resources are present, determining the MAP size as the final estimation value of a MAP size if the available resources are not present, and transmitting the burst according to the determined MAP size.

In accordance with another aspect of the present invention, an apparatus for estimating a MAP size in a broadband wireless communication system based on FFR is provided. The apparatus includes a selector for selecting one of a plurality of connections according to priority between the connections, a calculator for determining an available resource condition and a MAP size for allocation of resources for the selected connection, if acceptable resources for a burst are present in a zone including the selected connection, a determiner for determining the MAP size as the final estimation value of a MAP size if available resource are not present, wherein the selector selects a next connection according to the priority if the available resources are present.

According to another aspect of the present invention, a base station is provided. The base station includes a scheduler for allocating resources to user terminals based on an estimated MAP size for allocation of resources to user terminals, the estimated MAP size varying according to available resources; a message generator for generating a MAP message detailing the resource allocation of the scheduler; a data buffer for storing data to be transmitted in a data burst and for outputting the stored data according to the resource allocation of the scheduler; and a transmitter having an antenna, for transmitting a radio-frequency message based on the MAP message output from the message generator and/or the data output from the data buffer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made in the context of an Orthogonal Frequency Division Multiplexing/Orthogonal Frequency Division Multiple Access (OFDM/OFDMA) wireless communication system, to which the present invention is not limited. Thus, it should be clearly understood that the present invention is also applicable to any other wireless communication systems.

A downlink (DL) frame is divided into a preamble region, a MAP region, and a data burst allocation region. On a symbol axis, the data burst allocation region is divided into a segmented zone that employs Frequency Reuse Pattern (FRP)-3 and a nonsegmented zone that employs FRP-1. The segmented zone and the nonsegmented are subdivided into a nonHARQ burst allocation region and a Hybrid Automatic Repeat Request (HARQ) burst allocation region. The MAP region is used to transmit a MAP message indicating the location of an allocated data burst in the data burst allocation region.

Figure 1:
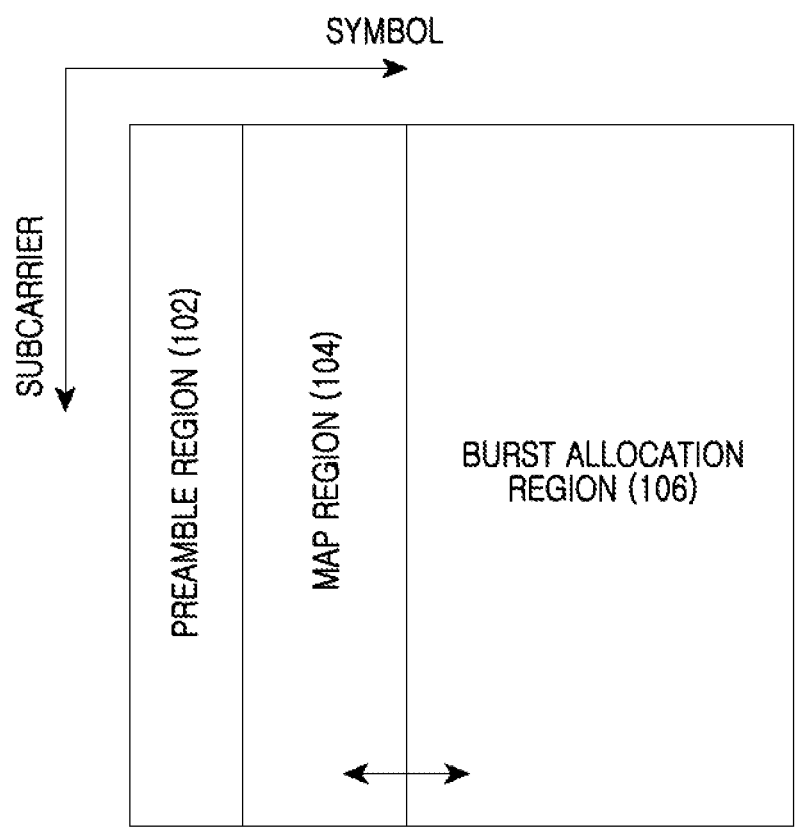
FIG. 1 is a diagram illustrating a DL frame structure for a Fractional Frequency Reuse (FFR) operation in a broadband wireless communication system according to an exemplary embodiment of the present invention.

FIG. 1 is a diagram illustrating a DL frame structure for an Fractional Frequency Reuse (FFR) operation in a broadband wireless communication system according to an exemplary embodiment of the present invention. Referring to FIG. 1, a DL frame is divided into a preamble region 102, a MAP region 104, and a burst allocation region 106. A preamble for synchronization is located in the preamble region 102. The MAP region 104 includes an uplink (UL) MAP and a DL MAP including broadcast data information that is received commonly by user terminals. DL data bursts to user terminals are allocated in the burst allocation region 106. Information about the location and allocation of the DL data bursts is included in the DL MAP transmitted through the MAP region 104. In the burst allocation region 106, a horizontal axis is a time axis referred by symbols and a vertical axis is a frequency axis referred by subcarriers. Embodiments of the present invention estimate the number of subchannels providing the best performance effect if a common subchannel and a dedicated subchannel are used in the data burst region.

Figure 2A:
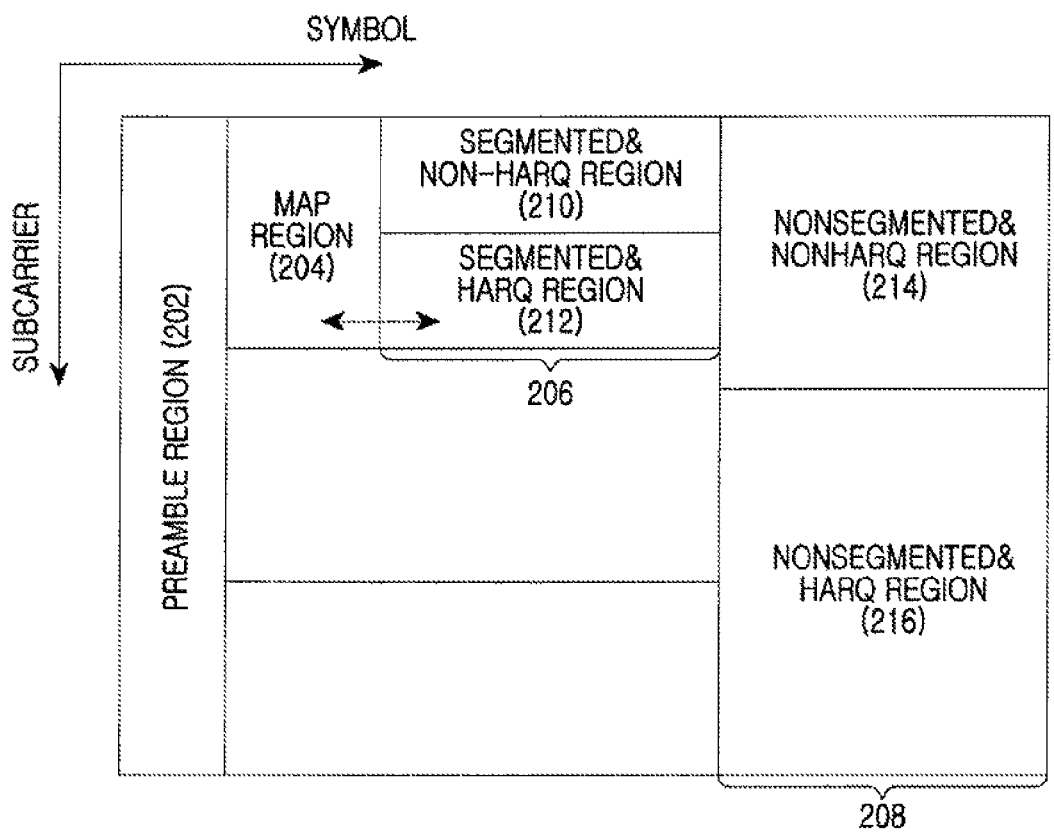
FIGS. 2A to 2C are diagrams illustrating DL frame structures for an FFR operation in a broadband wireless communication system according to an exemplary embodiment of the present invention.
Figure 2B:
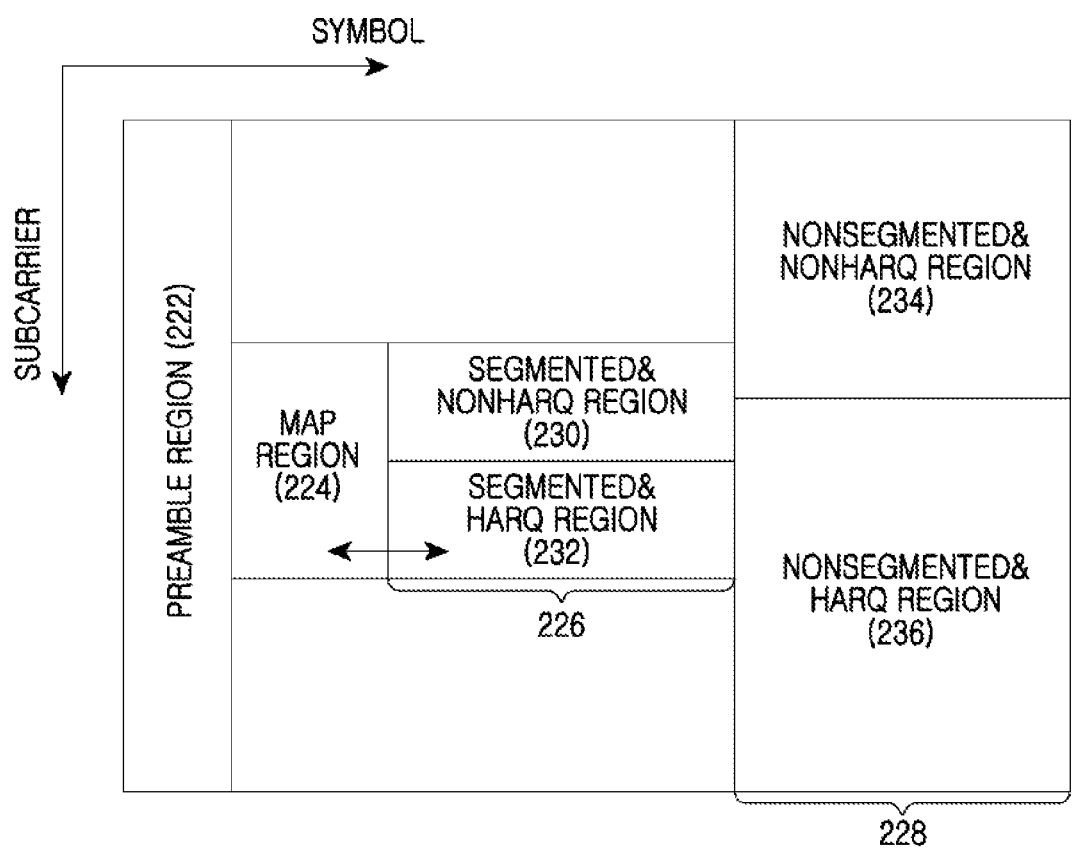
Figure 2C:
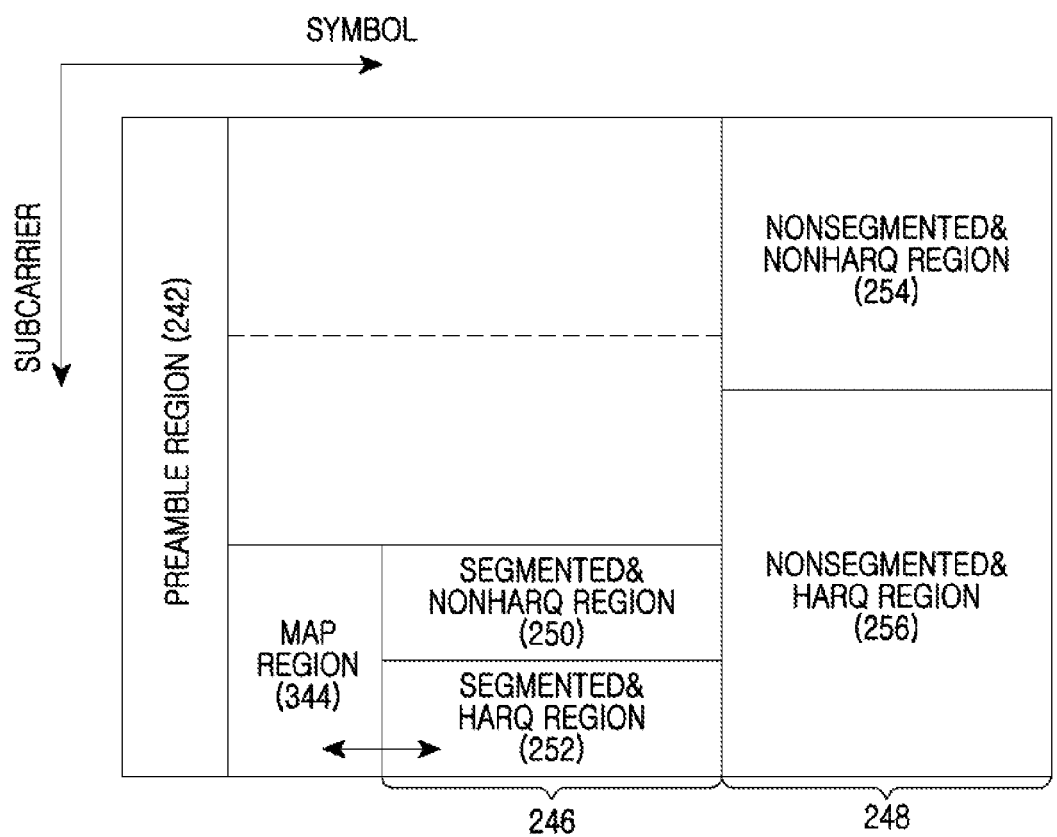

FIGS. 2A to 2C are diagrams illustrating DL frame structures for an FFR operation in a broadband wireless communication system according to an exemplary embodiment of the present invention. FIGS. 2A to 2C illustrate DL frame structures for three sectors.

Referring to FIG. 2A, a DL frame of an α sector is divided into a preamble region 202, a MAP region 204, a first burst allocation region 206, and a second burst allocation region 208. A preamble for synchronization is located in the preamble region 202. The MAP region 204 includes a UL MAP and a DL MAP including broadcast data information that is received commonly by user terminals. DL data bursts transmitted to user terminals are allocated in the first burst allocation region 206 and the second burst allocation region 208. Segmented zone type data bursts are allocated in the first burst allocation region 206. Nonsegmented zone type data bursts are allocated in the second burst allocation region 208. Information about the location and allocation of the DL data bursts is included in the DL MAP transmitted through the MAP region 204.

In the first burst allocation region 206 and the second burst allocation region 208, a horizontal axis is a time axis referred by symbols and a vertical axis is a frequency axis referred by subcarriers. The first burst allocation region 206 is a segmented zone, which is divided into a segmented & nonHARQ region 210 for allocation of nonHARQ bursts and a segmented & HARQ region 212 for allocation of HARQ bursts. The second burst allocation region 208 is a nonsegmented zone, which is divided into a nonsegmented & nonHARQ region 214 for allocation of nonHARQ bursts and a nonsegmented & HARQ region 216 for allocation of HARQ bursts. Although FIG. 2A shows that the burst allocation region 206/208 is divided into two subburst regions, i.e., the nonHARQ region 210/214 and the HARQ region 212/216, the present invention is not limited thereto. According to other exemplary embodiments of the present invention, each of the burst allocation regions 206 and 208 may be divided into three or more subburst regions.

Referring to FIG. 2B, a DL frame of a β sector is divided into a preamble region 222, a MAP region 224, a first burst allocation region 226, and a second burst allocation region 228. A preamble for synchronization is located in the preamble region 222. The MAP region 224 includes a UL MAP and a DL MAP including broadcast data information that is received commonly by user terminals. DL data bursts transmitted to user terminals are allocated in the first burst allocation region 226 and the second burst allocation region 228. Segmented zone type data bursts are allocated in the first burst allocation region 226. Nonsegmented zone type data bursts are allocated in the second burst allocation region 228. Information about the location and allocation of the DL data bursts is included in the DL MAP transmitted through the MAP region 224.

In the first burst allocation region 226 and the second burst allocation region 228, a horizontal axis is a time axis referred by symbols and a vertical axis is a frequency axis referred by subcarriers. The first burst allocation region 226 is a segmented zone, which is divided into a segmented & nonHARQ region 230 for allocation of nonHARQ bursts and a segmented & HARQ region 232 for allocation of HARQ bursts. The second burst allocation region 228 is a nonsegmented zone, which is divided into a nonsegmented & nonHARQ region 234 for allocation of nonHARQ bursts and a nonsegmented & HARQ region 236 for allocation of HARQ bursts. Although FIG. 2B shows that the burst allocation region 226/228 is divided into two subburst regions, i.e., the nonHARQ region 230/234 and the HARQ region 232/236, the present invention is not limited thereto. According to other exemplary embodiments of the present invention, each of the burst allocation regions 226 and 228 may be divided into three or more subburst regions.

Referring to FIG. 2C, a DL frame of a y sector is divided into a preamble region 242, a MAP region 244, a first burst allocation region 246, and a second burst allocation region 248. A preamble for synchronization is located in the preamble region 242. The MAP region 244 includes a UL MAP and a DL MAP including broadcast data information that is received commonly by user terminals. DL data bursts transmitted to user terminals are allocated in the first burst allocation region 246 and the second burst allocation region 248. Segmented zone type data bursts are allocated in the first burst allocation region 246. Nonsegmented zone type data bursts are allocated in the second burst allocation region 248. Information about the location and allocation of the DL data bursts is included in the DL MAP transmitted through the MAP region 244.

In the first burst allocation region 246 and the second burst allocation region 248, a horizontal axis is a time axis referred by symbols and a vertical axis is a frequency axis referred by subcarriers. The first burst allocation region 246 is a segmented zone, which is divided into a segmented & nonHARQ region 250 for allocation of nonHARQ bursts and a segmented & HARQ region 252 for allocation of HARQ bursts. The second burst allocation region 248 is a nonsegmented zone, which is divided into a nonsegmented & nonHARQ region 254 for allocation of nonHARQ bursts and a nonsegmented & HARQ region 256 for allocation of HARQ bursts. Although FIG. 2C shows that the burst allocation region 246/248 is divided into two subburst regions, i.e., the nonHARQ region 250/254 and the HARQ region 252/256, the present invention is not limited thereto. According to other exemplary embodiments of the present invention, each of the burst allocation regions 246 and 248 may be divided into three or more subburst regions.

In FIGS. 2A to 2C, an integer number of time slots are used to allocate the data bursts in the burst allocation regions 206, 208, 226, 228, 246 and 248. In this case, when the data bursts are allocated in a two-dimensional manner based on the frequency axis and the time axis, there should be no waste of slots in the DL frame. The DL frame is represented by the frequency axis and the time axis and includes a plurality of slots considering both frequency and time.

Figure 3:
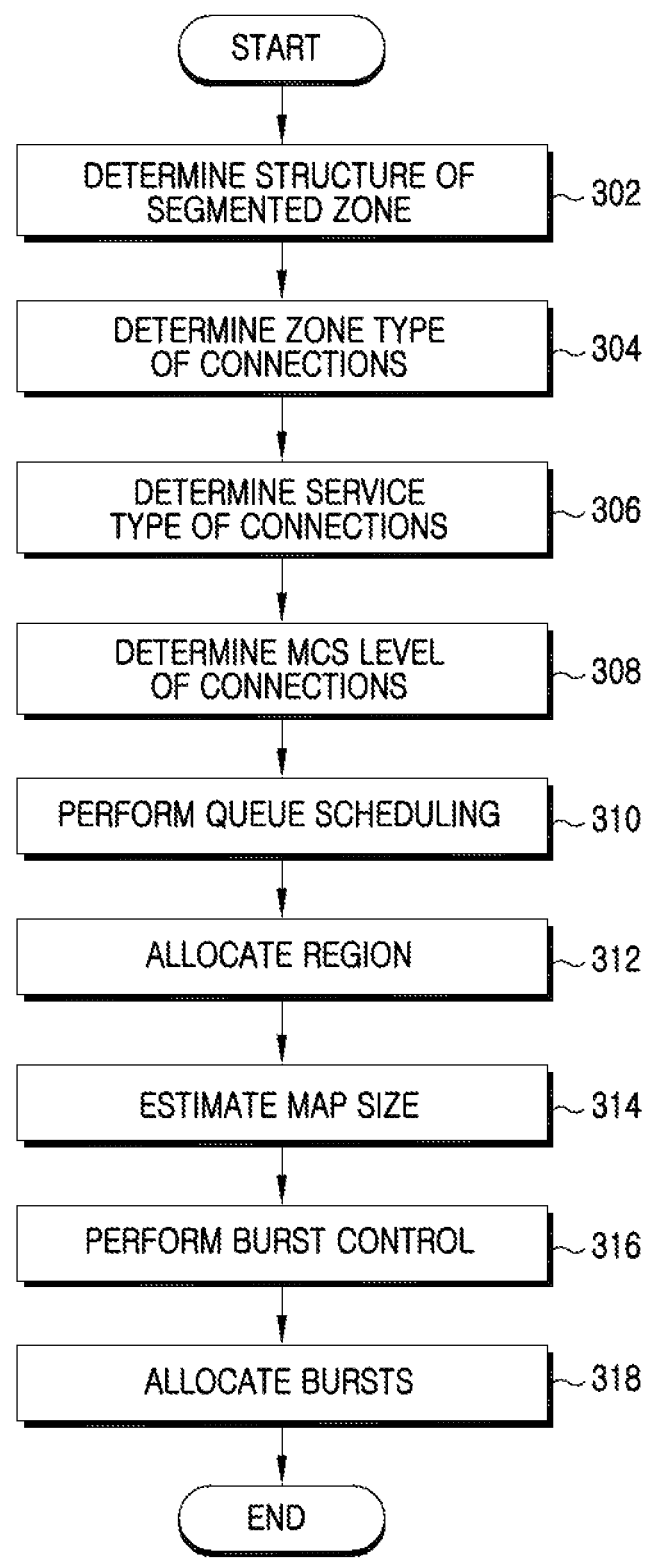
FIG. 3 is a flowchart illustrating a resource allocation process of a base station in a broadband wireless communication system according to an exemplary embodiment of the present invention.

FIG. 3 is a flowchart illustrating a resource allocation process of a base station in a broadband wireless communication system according to an exemplary embodiment of the present invention. Referring to FIG. 3, the base station determines a structure of a segmented zone in step 302. The base station determines whether to operate the segmented zone in Non-MIMO (i.e., one of Single-Input Single-Output (SISO) or Single-Input Multiple-Output (SIMO)), Multiple-Input Multiple-Output (MIMO), or NonMIMO & MIMO. For example, if a Media Access Control (MAC) management message with a NonMIMO service type is a candidate connection allocatable to the current frame, the base station operates the segmented zone in NonMIMO. On the other hand, if a MAC management message with a NonMIMO service type is not among the candidate connections allocatable to the current frame, the base station operates the segmented zone in MIMO.

In step 304, the base station determines a connection of an edge user with a low Carrier to Interference-plus-Noise Ratio (CINR) as a connection of a segmented zone type 'FRP-3', and determines a connection of a near user with a high CINR as a connection of a nonsegmented zone type 'FRP-1'. For example, if the CINR of FRP-3 is greater than three times of the CINR of the FRP-1, the corresponding connection is determined as a segmented zone type. If the CINR of FRP-3 is smaller than or equal to three times of the CINR of the FRP-1, the corresponding connection is determined as a nonsegmented zone type. An MPR may be used instead of the CINR. The CINR of FRP-3 indicates the CINR measured in an FRP-3 based region, and the CINR of FRP-1 indicates the CINR measured in an FRP-1 based region.

In step 306, the base station determines whether to transmit candidate connections allocatable to the current frame in a NonMIMO service type or in a MIMO service type. The base station determines the service type of connections. For example, a connection of a segmented zone type is determined as a NonMIMO or MIMO service type, and a nonsegmented zone type is determined as a MIMO service type.

In step 308, the base station determines the MCS level of the candidate connections allocatable to the current frame. The base station determines a modulation scheme and a coding scheme for each of the allocatable candidate connections. In step 310, the base station performs queue scheduling to determine the priority of each connection for a data burst to be transmitted for each service class. In step 312, the base station determines a region for allocation of data bursts to be transmitted. Herein, the regions for allocation of the data bursts are divided into a segmented & nonHARQ region, a segmented & HARQ region, a nonsegmented & nonHARQ region and a nonsegmented & HARQ region.

In step 314, the base station estimates a MAP overhead necessary to transmit resource allocation information of data bursts to be transmitted. The MAP size should be set to be large if there are many data bursts to be transmitted. However, if the MAP size is set to be large, the size of a data burst region decreases. Thus, the MAP size and the size of the data burst region must be determined suitably in a trade-off manner. The MAP size estimation operation of step 314 will be described later in detail with reference to FIGS. 4 and 5.

In step 316, the base station performs burst control to minimize the MAP overhead. In order to reduce the MAP overhead, the base station performs a data burst connection that integrates data bursts transmitted to the same user terminal or data bursts based on the same MCS level. In step 318, the base station allocates input data bursts in a burst allocation region of a DL frame according transmission priority.

Figure 4:
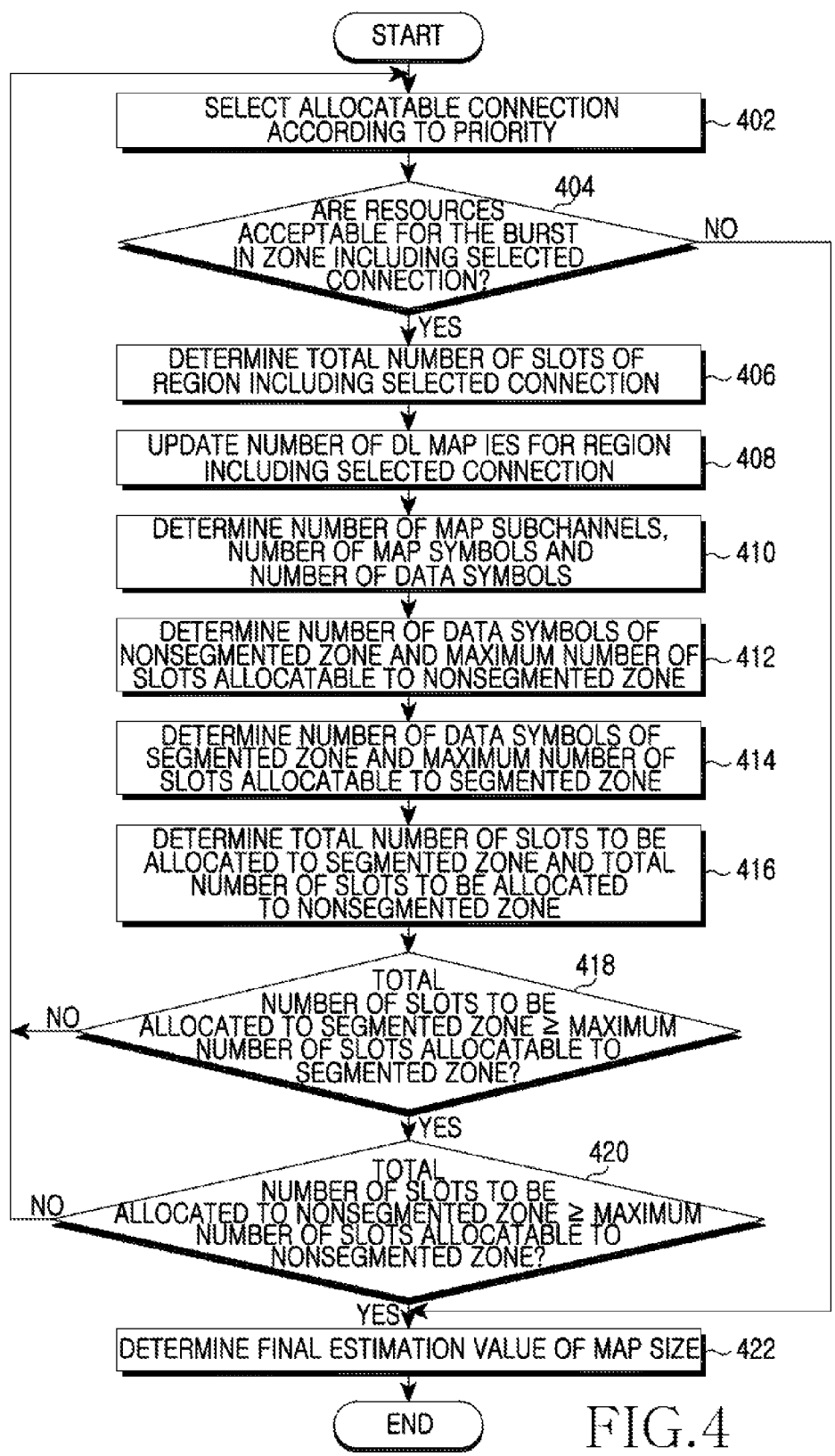
FIG. 4 is a flowchart illustrating a MAP size estimation process of the base station in a broadband wireless communication system according to an exemplary embodiment of the present invention.

FIG. 4 is a flowchart illustrating a MAP size estimation process of the base station in a broadband wireless communication system according to an exemplary embodiment of the present invention. Referring to FIG. 4, the base station selects an allocatable connection according to the scheduling priority in step 402.

In step 404, if the selected connection is a segmented zone type, the base station determines whether acceptable resources for a burst are present in the segmented zone. If the selected connection is the nonsegmented zone type, the base station determines whether acceptable resources for the burst are present in a nonsegmented zone. If the resources are present, the base station proceeds to step 406. If the resources are not present, the base station proceeds to step 422. Herein, the resources may refer to slots.

In step 406, the base station determines the total number of slots to be allocated to a region including the selected connection. The region may be one of a segmented & nonHARQ region, a segmented & HARQ region, a nonsegmented & nonHARQ region, and a nonsegmented & HARQ region. Whenever selecting an allocatable connection according to the scheduling priority, the base station determines the total number of slots to be allocated to a region including the selected connection.

In step 408, the base station updates the number of DL subburst Information Elements (IEs) or DL MAP IEs for the region including the selected connection. If burst allocation information for the region including the selected connection is added in the MAP due to the selected connection, the base station increases the number of the DL subburst IEs or DL MAP IEs.

For example, if the selected connection is included in a segmented & nonHARQ region, the segmented zone is operated as a nonMIMO zone, and there is no MCS level identical to the MCS level of the selected connection among the MCS levels of the previously selected connections included in the segmented & nonHARQ region, then the base station increases the number of segmented-nonHARQ-SIMO-DL-MAP IEs by one.

If the selected connection is included in a segmented & HARQ region, the segmented zone is operated as a non-MIMO zone, and there is no user terminal identical to the receiving user terminal of the selected connection among the receiving user terminals of the previously selected connections included in the segmented & HARQ region, then the base station increases the number of DL-segmented-HARQ-SIMO-subburst IEs by one. The receiving user terminal of the connection is detected through a B-CID included in each connection.

If the selected connection is included in a segmented & nonHARQ region, the segmented zone is operated as a MIMO zone, and there is no user terminal identical to the receiving user terminal of the selected connection among the receiving user terminals of the previously selected connections included in the segmented & nonHARQ region, then the base station increases the number of DL-segmented-non-HARQ-MIMO-subburst IEs by one. The receiving user terminal of the connection is detected through a B-CID included in each connection.

If the selected connection is included in a segmented & HARQ region, the segmented zone is operated as a MIMO zone, and there is no user terminal identical to the receiving user terminal of the selected connection among the receiving user terminals of the previously selected connections included in the segmented & HARQ region, then the base station increases the number of DL-segmented-HARQ-MIMO-subburst IEs by one. The receiving user terminal of the connection is detected through a B-CID included in each connection.

If the selected connection is included in a nonsegmented & nonHARQ region, the nonsegmented zone is operated as a MIMO zone, and there is no user terminal identical to the receiving user terminal of the selected connection among the receiving user terminals of the previously selected connections included in the nonsegmented & nonHARQ region, the base station increases the number of DL-nonsegmented-non-HARQ-MIMO-subburst IEs by one. The receiving user terminal of the connection is detected through a B-CID included in each connection.

If the selected connection is included in a nonsegmented & HARQ region, the nonsegmented zone is operated as a MIMO zone, and there is no user terminal identical to the receiving user terminal of the selected connection among the receiving user terminals of the previously selected connections included in the nonsegmented & HARQ region, then the base station increases the number of DL-nonsegmented-HARQ-MIMO-subburst IEs by one. The receiving user terminal of the connection is detected through a B-CID included in each connection.

In step 410, the base station determines the number of MAP subchannels, the number of MAP symbols, and the number of data symbols. The DL MAP IE or DL subburst IE value is a parameter for determining the number of MAP subchannels, the number of MAP symbols, and the number of data symbols. Thus, if the segmented-nonHARQ-SIMO-DL-MAP IE, DL-segmented-HARQ-SIMO-subburst IE, DL-segmented-nonHARQ-MIMO-subburst IE, DL-segmented-HARQ-MIMO-subburst IE, DL-nonsegmented-nonHARQ-MIMO-subburst IE, and DL-nonsegmented-HARQ-MIMO-subburst IE values do not increase, then the number of MAP subchannels, the number of MAP symbols, and the number of data symbols also do not increase.

For example, for PUSC, the MAP size may be estimated as Equation (1):

$$RequiredInfo\_DL\_Common = 88 + 36 \times UL\_N\_I\_LEVEL\_IE + 44 \times STC\_DL\_ZONE\_IE$$

RequiredInfo_Seg_SIMO NonHarq=36×Seg_SIMO_
    NonHarq_dl_map_ie_cnt+CID_SWITCH_IE×
    (8×Seg_SIMO_NonHarq_dl_map_ie_cnt+16×
    cids_in_dl_map_cnt)

RequiredInfo_Seg_SIMO_Harq=76+36×dl_Seg_SI-
    MO_Harq_sub_burst_ie_cnt+8×diuc_change_cnt Bits_for_Seg_MIMO_NonHarq_region=48+10+35×
    dl_Seg_MIMO_NonHarq_sub_burst_ie_cnt+12×
    dedicated_MIMO_dl_control_ie_mode1_NonHarq_cnt Bits_for_Seg_MIMO_Harq_region_=48+10+2+40×
    dl_Seg_MIMO_Harq_sub_burst_ie_cnt+12×
    dedicated_MIMO_dl_control_ie_mode1_Harq_cnt Bits_for_Seg_MIMO_region=44+20+Bits_for_Seg_
    MIMO_NonHarq_region+Bits_for_MIMO_Har-
    q_region Bits_for_NonSeg_MIMO_NonHarq_region=48+10+
    35×dl_NonSeg_MIMO_NonHarq_sub_burst_
    ie_cnt+12×dedicated_MIMO_
    dl_control_ie_mode1_NonHarq_cnt Bits_for_NonSeg_MIMO_Harq_region=48+10+2+
    40×dl_NonSeg_MIMO_Harq_sub_burst_ie_cnt+
    12×dedicated_MIMO_dl_control_ie_mode1_Harq_cnt Bits_for_NonSeg_MIMO_region=44+20+Bits_for_
    NonSeg_MIMO_NonHarq_region+Bits_
    for_MIMO_Harq_region Number of DL MAP
    Bits=RequiredInfo_DL_Common+Required-
    Info_ Seg_SIMO_NonHarq+RequiredInfo_
    SIMO_ Harq+Bits_for_Seg_MIMO_region+
    Bits_for_ NonSeg_MIMO_region RequiredInfo_UL_Common=48+212×UL_CON-
    TROL_CH_IE+60×CDMA_ALLOC_IE RequiredInfo_UL_SIMO_NonHarq=32×SIMO_Non-
    Harq_UL_MAP_IE_cnt RequiredInfo_UL_SIMO_Harq=44+40×UL_SIMO_
    HARQ_SUB_BURST_IE_cnt RequiredInfo_UL_MIMO=60+40×UL_MIMO_SUB_
    BURST_IE_cnt+12×2

Number of UL MAP
    Bits=RequiredInfo_UL_Common+Required-
    Info_ UL_SIMO_NonHarq+RequiredInfo_UL_
    SIMO_Harq+RequiredInfo_UL_MIMO Number of MAP Bits=Number of DL MAP Bits+
    Number of UL MAP Bits+32(CRC)

Number of Map Slots (Subchannels)=ceil (Number of
    MAP Bits/48)×2+4(FCH)

Number of Map Symbols=Ceil (Number of Map
    Slots/10(Maximum Number of Subchannels per
    Symbols))×2

Number of Data Symbols=29−(1(Preamble)+Number
    of Map Symbols)     (1)

As used in Equation 1:

'RequiredInfo_DL_Common' denotes the number of bits of information necessary to construct a DL MAP;

'UL_N_I_LEVEL IE' denotes an IE indicating an UL interference and noise level;

'STC_DL_ZONE_IE' denotes an IE indicating a permutation and TX diversity mode for STC;

'RequiredInfo_Seg_SIMO_NonHarq' denotes the number of bits of information for allocation of segmented SIMO & nonHARQ bursts;

'Seg_SIMO_NonHarq_dl_map_ie_cnt' denotes the number of IEs for allocation of segmented SIMO & nonHARQ bursts;

'CID_SWITCH_IE' denotes an IE indicating the toggle of the inclusion of a CID in a DL MAP;

'cids_in_dl_map_cnt' denotes the number of CIDs included in a MAP IE for segmented SIMO & nonHARQ bursts;

'RequiredInfo_Seg_SIMO_Harq' denotes the number of bits of information for allocation of segmented SIMO & HARQ bursts;

'dl_Seg_SIMO_Harq_sub_burst_ie_cnt' denotes the number of IEs for allocation of segmented SIMO & HARQ bursts;

'diuc_change_cnt' denotes the number of times of changing the DIUC of segmented SIMO & HARQ bursts to be allocated;

'Bits_for_Seg_MIMO_NonHarq_region' denotes the number of bits of information for allocation of segmented MIMO & nonHARQ bursts;

'dl_Seg_MIMO_NonHarq_sub_burst_ie_cnt' denotes the number of IEs for allocation of segmented MIMO & nonHARQ bursts;

'dedicated_MIMO_dl_control_ie_mode1_NonHarq_cnt' denotes the number of IEs including dedicated control information for each MIMO & nonHARQ burst;

'Bits_for_Seg_MIMO_Harq_region' denotes the number of bits of information for allocation of segmented MIMO & HARQ bursts;

'dl_Seg_MIMO_Harq_sub_burst_ie_cnt' denotes the number of IEs for allocation of segmented MIMO & HARQ bursts;

'dedicated_MIMO_dl_control_ie_mode1_Harq_cnt' denotes the number of IEs including dedicated control information for each MIMO & HARQ burst;

'Bits_for_Seg_MIMO_region' denotes the number of bits of information for allocation of segmented MIMO & nonHARQ bursts and segmented MIMO & HARQ bursts;

'Bits_for_NonSeg_MIMO_NonHarq_region' denotes the number of bits of information for allocation of nonsegmented MIMO & nonHARQ bursts;

'dl_NonSeg_MIMO_NonHarq_sub_burst_ie_cnt' denotes the number of IEs for allocation of nonsegmented MIMO & nonHARQ bursts;

'Bits_for_NonSeg_MIMO_Harq_region' denotes the number of bits of information for allocation of nonsegmented MIMO & HARQ bursts;

'dl_NonSeg_MIMO_Harq_sub_burst_ie_cnt' denotes the number of IEs for allocation of nonsegmented MIMO & HARQ bursts;

'Bits_for_NonSeg_MIMO_region' denotes the number of bits of information for allocation of nonsegmented MIMO & nonHARQ bursts and nonsegmented MIMO & HARQ bursts;

'Number of DL MAP Bits' denotes the number of bits of a DL MAP message;

'RequiredInfo_UL_Common' denotes the number of bits of information necessary to construct a UL MAP;

'UL_CONTROL_CH_IE' denotes an IE for initial ranging, periodic ranging, bandwidth request ranging, CQI allocation, and ACK channel allocation;

'CDMA_ALLOC_IE' denotes an IE indicating a CDMA request code used for bandwidth allocation;

'RequiredInfo_UL_SIMO_NonHarq' denotes the number of bits of information for allocation of UL SIMO & nonHARQ bursts;

'SIMO_NonHarq_UL_MAP_IE_cnt' denotes the number of IEs for allocation of UL SIMO & nonHARQ bursts;

'RequiredInfo_UL_SIMO_Harq' denotes the number of bits of information for allocation of UL SIMO & HARQ bursts;

'UL_SIMO_HARQ_SUB_BURST_IE_cnt' denotes the number of IEs for allocation of UL SIMO & HARQ bursts;

'RequiredInfo_UL_MIMO' denotes the number of bits of information for allocation of UL MIMO & nonHARQ bursts and UL MIMO & HARQ bursts;

'UL_MIMO_SUB_BURST_IE_cnt' denotes the number of IEs for allocation of UL MIMO & nonHARQ bursts and UL MIMO & HARQ bursts;

'Number of UL MAP Bits' denotes the number of bits of a UL MAP message;

'Number of MAP Bits' denotes the total number of bits of a MAP message;

'Number of Map Slots (Subchannels)' denotes the number of slots occupied by a MAP message;

'Number of Map Symbols' denotes the number of symbols occupied by a MAP message;

'Number of Data Symbols' denotes the number of symbols occupied by data; and

'Preamble' denotes the number of symbols occupied by the preamble.

Equation (1) is used to determine the number of symbols of a MAP region for data burst allocation and the number of symbols of a data burst allocation region. The number of slots per two symbols in a frame with a PUSC structure is 30, and the number of slots per symbol in a frame with a FUSC structure is 16. After determining the number of the MAP symbols and the number of the data burst symbols, the base station may allocate a data burst to a burst region. In general, a preamble region in a DL frame is composed of one symbol, and the number of UL MAP IEs and DL MAP IEs in one frame period is determined by the number of UL data bursts and DL data bursts to be transmitted in the frame period. Embodiments of the present invention may change the number of the UL MAP IEs by not connecting data bursts.

In step 412, the base station determines the number of data symbols of a nonsegmented zone in a DL subframe and the maximum number of slots allocatable to a nonsegmented zone. For example, for PUSC, the number of the data symbols of the nonsegmented zone and the maximum number of the slots allocatable to the nonsegmented zone may be determined as Equation (2):

Number of Nonsegmented Zone Data Symbols=8

Maximum Number of Slots Allocatable to Nonsegmented Zone=30 (Maximum Number of Subchannels per Symbol)×(Number of Nonsegmented Zone Data Symbols)/2     (2)

where 'Number of Nonsegmented Zone Data Symbols' denotes the number of data symbols constituting a nonsegmented zone, 'Maximum Number of Slots Allocatable to Nonsegmented Zone' denotes the maximum number of slots allocatable to a nonsegmented zone, and 'Maximum Number of Subchannels per Symbol' denotes the number of subchannels constituting one symbol.

In step 414, the base station determines the number of data symbols of a segmented zone in a DL subframe and the maximum number of slots allocatable to a segmented zone. For example, for PUSC, the number of the data symbols of the segmented zone and the maximum number of the slots allocatable to the segmented zone may be determined as Equation (3):

Number of Segmented Zone Data Symbols=Number of Data Symbols−Number of Nonsegmented Zone Data Symbols Maximum Number of Slots Allocatable to Segmented Zone=10 (Maximum Number of Subchannels per Symbol)×(Number of Segmented Zone Data Symbols)/2     (3)

where 'Number of Segmented Zone Data Symbols' denotes the number of data symbols constituting a segmented zone, 'Number of Data Symbols' denotes the total number of data symbols of a frame, 'Number of Nonsegmented Zone Data Symbols' denotes the number of data symbols constituting a nonsegmented zone, 'Maximum Number of Slots Allocatable to Segmented Zone' denotes the maximum number of slots allocatable to a segmented zone, and 'Maximum Number of Subchannels per Symbol' denotes the number of subchannels constituting one symbol.

In step 416, the base station determines the total number of slots to be allocatable to a segmented zone in a DL subframe and the total number of slots to be allocatable to a nonsegmented zone. In step 418, the base station compares the total number of the slots to be allocated to the segmented zone and the maximum number of the slots allocatable to the segmented zone. If the total number of the slots to be allocated to the segmented zone is smaller than the maximum number of the slots allocatable to the segmented zone, the base station returns to step 402.

If the total number of the slots to be allocated to the segmented zone is greater than or equal to the maximum number of the slots allocatable to the segmented zone, the base station proceeds to step 420. In step 420, the base station compares the total number of the slots to be allocated to the nonsegmented zone and the maximum number of the slots allocatable to the nonsegmented zone. If the total number of the slots to be allocated to the nonsegmented zone is smaller than the maximum number of the slots allocatable to the nonsegmented zone, the base station returns to step 402.

If the total number of the slots to be allocated to the nonsegmented zone is greater than or equal to the maximum number of the slots allocatable to the nonsegmented zone, the base station proceeds to step 422. In step 422, the base station determines the final estimation value of a MAP size. The base station determines the currently determined MAP size as the final estimation value of the MAP size.

Figure 5:
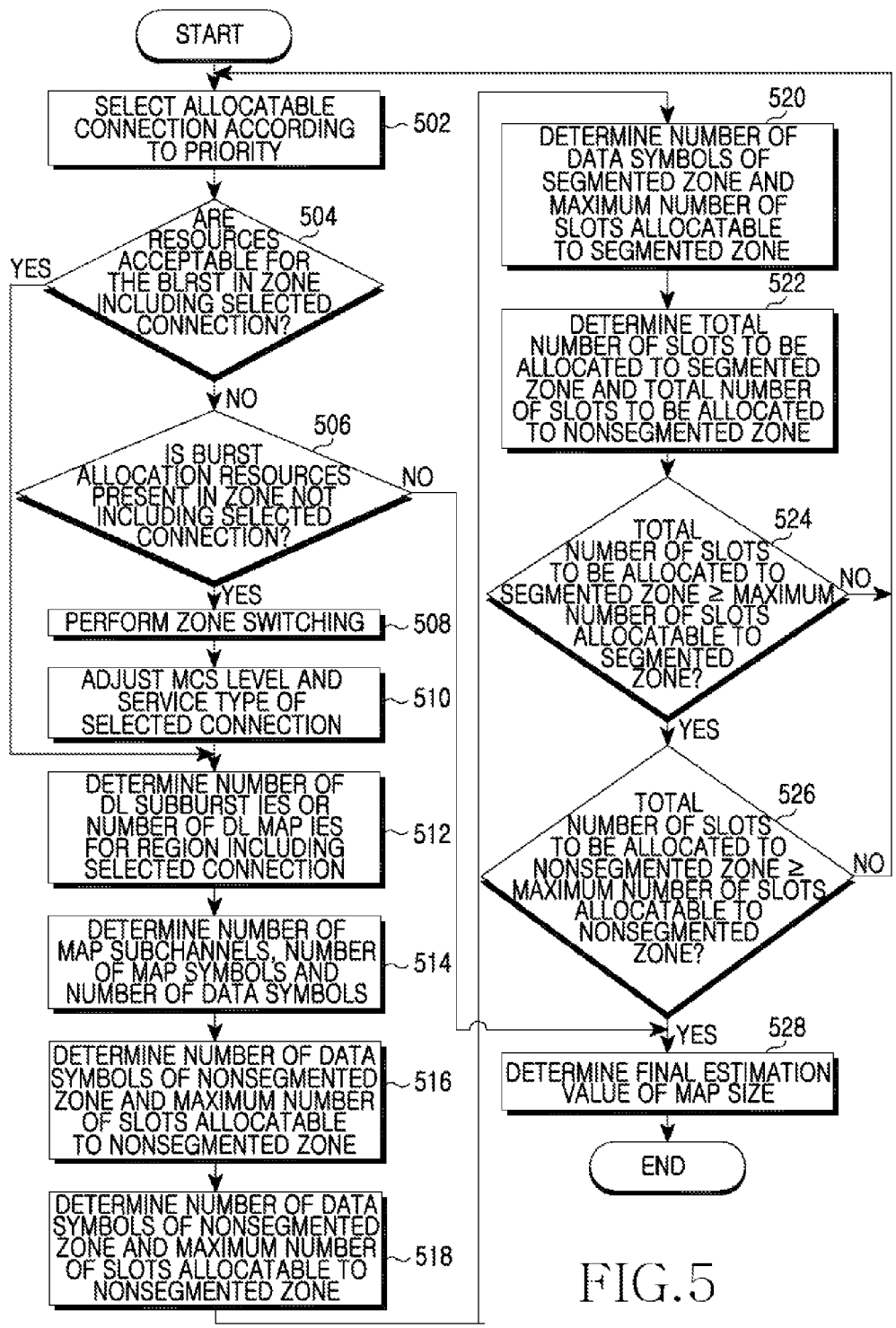
FIG. 5 is a flowchart illustrating a MAP size estimation process of the base station in a broadband wireless communication system according to another exemplary embodiment of the present invention.

FIG. 5 is a flowchart illustrating a MAP size estimation process of the base station in a broadband wireless communication system according to another exemplary embodiment of the present invention. Referring to FIG. 5, the base station selects an allocatable connection according to the scheduling priority in step 502.

In step 504, if the selected connection is a segmented zone type, the base station determines whether resources acceptable for a burst are present in the segmented zone. If the selected connection is a nonsegmented zone type, the base station determines whether resources acceptable for the burst are present in the nonsegmented zone. If the resources are present, the base station proceeds to step 512. If the resources are not present, the base station proceeds to step 506. Herein, the resources may refer to slots.

In step 506, if the selected connection is a segmented zone type, the base station determines whether acceptable resources for the burst are present in the nonsegmented zone. If the selected connection is a nonsegmented zone type, the base station determines whether acceptable resources for the burst are present in the segmented zone. If the resources are present, the base station proceeds to step 508. If the resources are not present, the base station proceeds to step 528.

In step 508, if the selected connection is a segmented zone type, the base station changes the zone type into a nonsegmented zone type. If the selected connection is a nonsegmented zone type, the base station changes the zone type into a segmented zone type. In step 510, the base station changes the Non-MIMO or MIMO service type of the selected connection according to the changed zone type and adjusts the MCS level of the selected connection.

In step 512, the base station determines the total number of slots to be allocated to a region including the selected connection. The region is one of a segmented & nonHARQ region, a segmented & HARQ region, a nonsegmented & nonHARQ region, and a nonsegmented & HARQ region. Whenever selecting an allocatable connection according to the scheduling priority, the base station determines the total number of slots to be allocated to a region including the selected connection.

In step 514, the base station updates the number of DL subburst IEs or DL MAP IEs for the region including the selected connection. If burst allocation information for the region including the selected connection is added in the MAP due to the selected connection, the base station increases the number of the DL subburst IEs or DL MAP IEs.

For example, if the selected connection is included in a segmented & nonHARQ region, the segmented zone is operated as a nonMIMO zone, and there is no MCS level identical to the MCS level of the selected connection among the MCS levels of the previously selected connections included in the segmented & nonHARQ region, then the base station increases the number of segmented-nonHARQ-SIMO-DL-MAP IEs by one.

If the selected connection is included in a segmented & HARQ region, the segmented zone is operated as a non-MIMO zone, and there is no user terminal identical to the receiving user terminal of the selected connection among the receiving user terminals of the previously selected connections included in the segmented & HARQ region, then the base station increases the number of DL-segmented-HARQ-SIMO-subburst IEs by one. The receiving user terminal of the connection is detected through a B-CID included in each connection.

If the selected connection is included in a segmented & nonHARQ region, the segmented zone is operated as a MIMO zone, and there is no user terminal identical to the receiving user terminal of the selected connection among the receiving user terminals of the previously selected connections included in the segmented & nonHARQ region, then the base station increases the number of DL-segmented-non-HARQ-MIMO-subburst IEs by one. The receiving user terminal of the connection is detected through a B-CID included in each connection.

If the selected connection is included in a segmented & HARQ region, the segmented zone is operated as a MIMO zone, and there is no user terminal identical to the receiving user terminal of the selected connection among the receiving user terminals of the previously selected connections included in the segmented & HARQ region, then the base station increases the number of DL-segmented-HARQ-MIMO-subburst IEs by one. The receiving user terminal of the connection is detected through a B-CID included in each connection.

If the selected connection is included in a nonsegmented & nonHARQ region, the nonsegmented zone is operated as a MIMO zone, and there is no user terminal identical to the receiving user terminal of the selected connection among the receiving user terminals of the previously selected connections included in the nonsegmented & nonHARQ region, then the base station increases the number of DL-nonsegmented-nonHARQ-MIMO-subburst IEs by one. The receiving user terminal of the connection is detected through a B-CID included in each connection.

If the selected connection is included in a nonsegmented & HARQ region, the nonsegmented zone is operated as a MIMO zone, and there is no user terminal identical to the receiving user terminal of the selected connection among the receiving user terminals of the previously selected connections included in the nonsegmented & HARQ region, then the base station increases the number of DL-nonsegmented-HARQ-MIMO-subburst IEs by one. The receiving user terminal of the connection is detected through a B-CID included in each connection.

In step 516, the base station determines the number of MAP subchannels, the number of MAP symbols, and the number of data symbols. The DL MAP IE or DL subburst IE value is a parameter for determining the number of MAP subchannels, the number of MAP symbols, and the number of data symbols. Thus, if the segmented-nonHARQ-SIMO-DL-MAP IE, DL-segmented-HARQ-SIMO-subburst IE, DL-segmented-nonHARQ-MIMO-subburst IE, DL-segmented-HARQ-MIMO-subburst IE, DL-nonsegmented-nonHARQ-MIMO-sub-burst IE, and DL-nonsegmented-HARQ-MIMO-subburst IE values do not increase, then the number of MAP subchannels, the number of MAP symbols, and the number of data symbols do not increase. For example, for PUSC, the MAP size may be estimated as Equation (4):

$$RequiredInfo\_DL\_Common = 88 + 36 \times UL\_N\_I\_LEVEL\_IE + 44 \times STC\_DL\_ZONE\_IE$$

$$RequiredInfo\_Seg\_SIMO\_NonHarq = 36 \times Seg\_SIMO\_NonHarq\_dl\_map\_ie\_cnt + CID\_SWITCH\_IE \times (8 \times Seg\_SIMO\_NonHarq\_dl\_map\_ie\_cnt + 16 \times cids\_in\_dl\_map\_cnt)$$

$$RequiredInfo\_Seg\_SIMO\_Harq = 76 + 36 \times dl\_Seg\_SIMO\_Harq\_sub\_burst\_ie\_cnt + 8 \times diuc\_change\_cnt$$

$$Bits\_for\_Seg\_MIMO\_NonHarq\_region = 48 + 10 + 35 \times dl\_Seg\_MIMO\_NonHarq\_sub\_burst\_ie\_cnt + 12 \times dedicated\_MIMO\_dl\_control\_ie\_mode1\_NonHarq\_cnt$$

$$Bits\_for\_Seg\_MIMO\_Harq\_region = 48 + 10 + 2 + 40 \times dl\_Seg\_MIMO\_Harq\_sub\_burst\_ie\_cnt + 12 \times dedicated\_MIMO\_dl\_control\_ie\_mode1\_Harq\_cnt$$

$$Bits\_for\_Seg\_MIMO\_region = 44 + 20 + Bits\_for\_Seg\_MIMO\_NonHarq\_region + Bits\_for\_MIMO\_Harq\_region$$

$$Bits\_for\_NonSeg\_MIMO\_NonHarq\_region = 48 + 10 + 35 \times dl\_NonSeg\_MIMO\_NonHarq\_sub\_burst\_ie\_cnt + 12 \times dedicated\_MIMO\_dl\_control\_ie\_mode1\_NonHarq\_cnt$$

$$Bits\_for\_NonSeg\_MIMO\_Harq\_region = 48 + 10 + 2 + 40 \times dl\_NonSeg\_MIMO\_Harq\_sub\_burst\_ie\_cnt + 12 \times dedicated\_MIMO\_dl\_control\_ie\_mode1\_Harq\_cnt$$

$$Bits\_for\_NonSeg\_MIMO\_region = 44 + 20 + Bits\_for\_NonSeg\_MIMO\_NonHarq\_region + Bits\_for\_MIMO\_Harq\_region$$

$$Number\ of\ DL\ MAP\ Bits = RequiredInfo\_DL\_Common + RequiredInfo\_Seg\_SIMO\_NonHarq + RequiredInfo\_SIMO\_Harq + Bits\_for\_Seg\_MIMO\_region + Bits\_for\_NonSeg\_MIMO\_region$$

$$RequiredInfo\_UL\_Common = 48 + 212 \times UL\_CONTROL\_CH\_IE + 60 \times CDMA\_ALLOC\_IE$$

$$RequiredInfo\_UL\_SIMO\_NonHarq = 32 \times SIMO\_NonHarq\_UL\_MAP\_IE\_cnt$$

RequiredInfo_UL_SIMO_Harq=44+40×UL_SIMO_HARQ_SUB_BURST_IE_cnt

RequiredInfo_UL_MIMO=60+40×UL_MIMO_SUB_BURST_IE_cnt+12×2

Number of UL MAP Bits=RequiredInfo_UL_Common+RequiredInfo_UL_SIMO_NonHarq+RequiredInfo_UL_SIMO_Harq+RequiredInfo_UL_MIMO Number of MAP Bits=Number of DL MAP Bits+Number of UL MAP Bits+32(CRC)

Number of Map Slots (Subchannels)=ceil (Number of MAP Bits/48)×2+4(FCH)

Number of Map Symbols=Ceil (Number of Map Slots/10(Maximum Number of Subchannels per Symbols))×2

Number of Data Symbols=29−(1(Preamble)+Number of Map Symbols)  (4)

As used in Equation 4:

'RequiredInfo_DL_Common' denotes the number of bits of information necessary to construct a DL MAP;

'UL_N_I_LEVEL_IE' denotes an IE indicating an UL interference and noise level;

'STC_DL_ZONE_IE' denotes an IE indicating a permutation and TX diversity mode for STC;

'RequiredInfo_Seg_SIMO_NonHarq' denotes the number of bits of information for allocation of segmented SIMO & nonHARQ bursts;

'Seg_SIMO_NonHarq_dl_map_ie_cnt' denotes the number of IEs for allocation of segmented SIMO & nonHARQ bursts;

'CID_SWITCH_IE' denotes an IE indicating the toggle of the inclusion of a CID in a DL MAP;

'cids_in_dl_map_cnt' denotes the number of CIDs included in a MAP IE for segmented SIMO & nonHARQ bursts;

'RequiredInfo_Seg_SIMO_Harq' denotes the number of bits of information for allocation of segmented SIMO & HARQ bursts;

'dl_Seg_SIMO_Harq_sub_burst_ie_cnt' denotes the number of IEs for allocation of segmented SIMO & HARQ bursts;

'diuc_change_cnt' denotes the number of times of changing the DIUC of segmented SIMO & HARQ bursts to be allocated;

'Bits_for_Seg_MIMO_NonHarq_region' denotes the number of bits of information for allocation of segmented MIMO & nonHARQ bursts;

'dl_Seg_MIMO_NonHarq_sub_burst_ie_cnt' denotes the number of IEs for allocation of segmented MIMO & nonHARQ bursts;

'dedicated_MIMO_dl_control_ie_mode1_NonHarq_cnt' denotes the number of IEs including dedicated control information for each MIMO & nonHARQ burst;

'Bits_for_Seg_MIMO_Harq_region' denotes the number of bits of information for allocation of segmented MIMO & HARQ bursts;

'dl_Seg_MIMO_Harq_sub_burst_ie_cnt' denotes the number of IEs for allocation of segmented MIMO & HARQ bursts;

'dedicated_MIMO_dl_control_ie_mode1_Harq_cnt' denotes the number of IEs including dedicated control information for each MIMO & HARQ burst;

'Bits_for_Seg_MIMO region' denotes the number of bits of information for allocation of segmented MIMO & nonHARQ bursts and segmented MIMO & HARQ bursts;

'Bits_for_NonSeg_MIMO_NonHarq_region' denotes the number of bits of information for allocation of nonsegmented MIMO & nonHARQ bursts;

'dl_NonSeg_MIMO_NonHarq_sub_burst_ie_cnt' denotes the number of IEs for allocation of nonsegmented MIMO & nonHARQ bursts;

'Bits_for_NonSeg_MIMO_Harq_region' denotes the number of bits of information for allocation of nonsegmented MIMO & HARQ bursts;

'dl_NonSeg_MIMO_Harq_sub_burst_ie_cnt' denotes the number of IEs for allocation of nonsegmented MIMO & HARQ bursts;

'Bits_for_NonSeg_MIMO_region' denotes the number of bits of information for allocation of nonsegmented MIMO & nonHARQ bursts and nonsegmented MIMO & HARQ bursts;

'Number of DL MAP Bits' denotes the number of bits of a DL MAP message;

'RequiredInfo_UL_Common' denotes the number of bits of information necessary to construct a UL MAP;

'UL_CONTROL_CH_IE' denotes an IE for initial ranging, periodic ranging, bandwidth request ranging, CQI allocation, and ACK channel allocation;

'CDMA_ALLOC_IE' denotes an IE indicating a CDMA request code used for bandwidth allocation;

'RequiredInfo_UL_SIMO_NonHarq' denotes the number of bits of information for allocation of UL SIMO & nonHARQ bursts;

'SIMO_NonHarq_UL_MAP_IE_cnt' denotes the number of IEs for allocation of UL SIMO & nonHARQ bursts;

'RequiredInfo_UL_SIMO_Harq' denotes the number of bits of information for allocation of UL SIMO & HARQ bursts;

'UL_SIMO_HARQ_SUB_BURST_IE_cnt' denotes the number of IEs for allocation of UL SIMO & HARQ bursts;

'RequiredInfo_UL_MIMO' denotes the number of bits of information for allocation of UL MIMO & nonHARQ bursts and UL MIMO & HARQ bursts;

'UL_MIMO_SUB_BURST_IE_cnt' denotes the number of IEs for allocation of UL MIMO & nonHARQ bursts and UL MIMO & HARQ bursts;

'Number of UL MAP Bits' denotes the number of bits of a UL MAP message;

'Number of MAP Bits' denotes the total number of bits of a MAP message;

'Number of Map Slots (Subchannels)' denotes the number of slots occupied by a MAP message;

'Number of Map Symbols' denotes the number of symbols occupied by a MAP message;

'Number of Data Symbols' denotes the number of symbols occupied by data; and

'Preamble' denotes the number of symbols occupied by the preamble.

Equation (4) is used to determine the number of symbols of a MAP region for data burst allocation and the number of symbols of a data burst allocation region. The number of slots per two symbols in a frame with a PUSC structure is 30, and the number of slots per symbol in a frame with a FUSC structure is 16. After determining the number of the MAP symbols and the number of the data burst symbols, the base station may allocate a data burst to a burst region. In general, a preamble region in a DL frame is composed of one symbol, and the number of UL MAP IEs and DL MAP IEs in one frame period is determined by the number of UL data bursts and DL data bursts to be transmitted in the frame period. The present invention may change the number of the UL MAP IEs by not connecting data bursts.

In step 518, the base station determines the number of data symbols of a nonsegmented zone in a DL subframe and the maximum number of slots allocatable to a nonsegmented zone. For example, for PUSC, the number of the data symbols of the nonsegmented zone and the maximum number of the slots allocatable to the nonsegmented zone may be determined as Equation (5):

Number of Nonsegmented Zone Data Symbols=8

Maximum Number of Slots Allocatable to Nonsegmented Zone=30 (Maximum Number of Subchannels per Symbol)×(Number of Nonsegmented Zone Data Symbols)/2   (5)

As used in Equation 5, 'Number of Nonsegmented Zone Data Symbols' denotes the number of data symbols constituting a nonsegmented zone, 'Maximum Number of Slots Allocatable to Nonsegmented Zone' denotes the maximum number of slots allocatable to a nonsegmented zone, and 'Maximum Number of Subchannels per Symbol' denotes the number of subchannels constituting one symbol.

In step 520, the base station determines the number of data symbols of a segmented zone in a DL subframe and the maximum number of slots allocatable to a segmented zone. For example, for PUSC, the number of the data symbols of the segmented zone and the maximum number of the slots allocatable to the segmented zone may be determined as Equation (6):

Number of Segmented Zone Data Symbols=Number of Data Symbols−Number of Nonsegmented Zone Data Symbols Maximum Number of Slots Allocatable to Segmented Zone=10 (Maximum Number of Subchannels per Symbol)×(Number of Segmented Zone Data Symbols)/2   (6)

As used in Equation 6, 'Number of Segmented Zone Data Symbols' denotes the number of data symbols constituting a segmented zone, 'Number of Data Symbols' denotes the total number of data symbols of a frame, 'Number of Nonsegmented Zone Data Symbols' denotes the number of data symbols constituting a nonsegmented zone, 'Maximum Number of Slots Allocatable to Segmented Zone' denotes the maximum number of slots allocatable to a segmented zone, and 'Maximum Number of Subchannels per Symbol' denotes the number of subchannels constituting one symbol.

In step 522, the base station determines the total number of slots to be allocatable to a segmented zone in a DL subframe and the total number of slots to be allocatable to a nonsegmented zone. In step 524, the base station compares the total number of the slots to be allocated to the segmented zone and the maximum number of the slots allocatable to the segmented zone. If the total number of the slots to be allocated to the segmented zone is smaller than the maximum number of the slots allocatable to the segmented zone, the base station returns to step 502.

If the total number of the slots to be allocated to the segmented zone is greater than or equal to the maximum number of the slots allocatable to the segmented zone, the base station proceeds to step 526. In step 526, the base station compares the total number of the slots to be allocated to the nonsegmented zone and the maximum number of the slots allocatable to the nonsegmented zone. If the total number of the slots to be allocated to the nonsegmented zone is smaller than the maximum number of the slots allocatable to the nonsegmented zone, the base station returns to step 502.

If the total number of the slots to be allocated to the nonsegmented zone is greater than or equal to the maximum number of the slots allocatable to the nonsegmented zone, the base station proceeds to step 528. In step 528, the base station determines the final estimation value of a MAP size. The base station determines the currently determined MAP size as the final estimation value of the MAP size.

Figure 6:
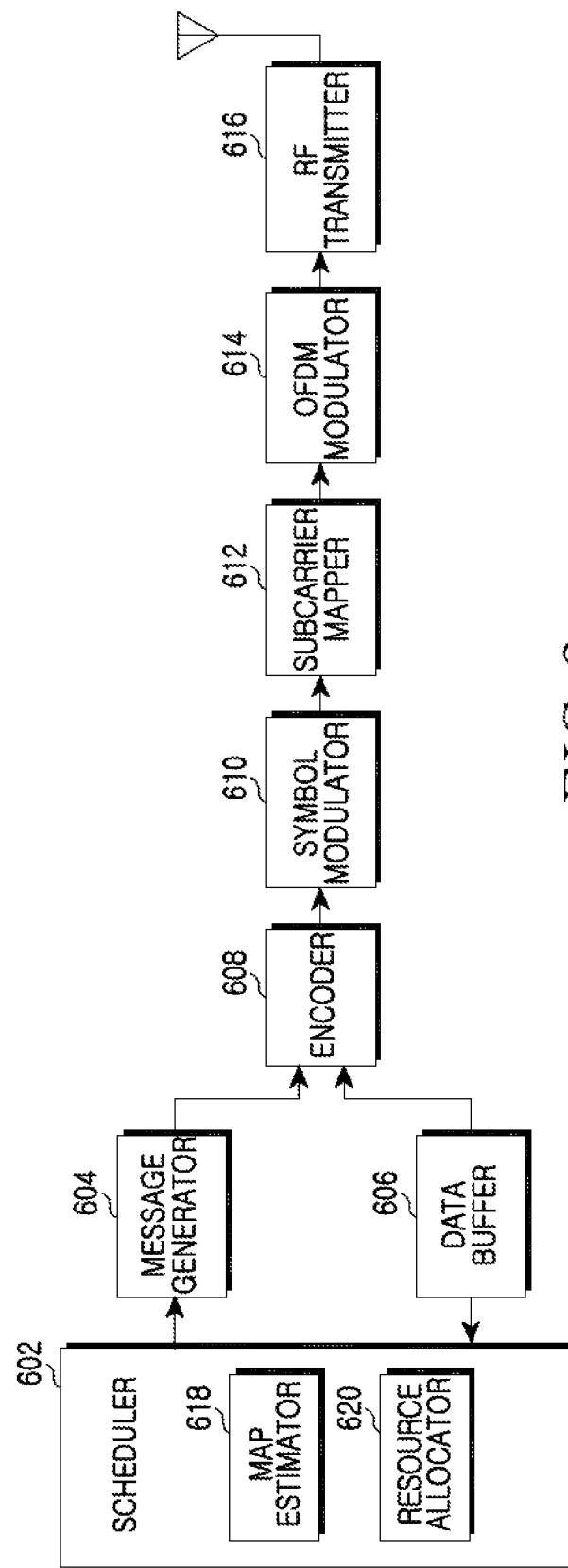
FIG. 6 is a block diagram of the base station in a broadband wireless communication system according to an exemplary embodiment of the present invention.

FIG. 6 is a block diagram of the base station in a broadband wireless communication system according to an exemplary embodiment of the present invention. Referring to FIG. 6, the base station includes a scheduler 602, a message generator 604, a data buffer 606, an encoder 608, a symbol modulator 610, a subcarrier mapper 612, an OFDM modulator 614, and a radio frequency (RF) transmitter 616. The base station may also include additional units. Similarly, the functionality of the above units may be integrated into a single component.

The scheduler 602 allocates resources to accessed user terminals. The scheduler 602 divides a frame into a segmented zone and a nonsegmented zone, and determines the priority, zone type, service type, and MCS level of connections. The scheduler 602 also estimates a MAP size through a MAP estimator 618 and allocates a resource to each connection through a resource allocator 620. The structure and operation of the MAP estimator 618 will be described later in detail with reference to FIG. 7. The message generator 604 generates a message to be transmitted to user terminals. In particular, the message generator 604 generates a MAP message to transmit the resource allocation results, received from the scheduler 602, to user terminals. The data buffer 606 stores data to be transmitted, and outputs data stored according to the resource allocation results of the scheduler 602.

The encoder 608 channel-encodes an information bit stream received from the message generator 604 and the data buffer 606. The symbol modulator 610 modulates the channel-encoded bit stream into complex symbols. The subcarrier mapper 612 maps the complex symbols to a frequency domain according to the resource allocation results of the scheduler 602. The OFDM modulator 614 converts the complex symbols, mapped to the frequency domain, into a time-domain signal through an Inverse Fast Fourier Transform (IFFT) operation and inserts a CP to construct OFDM symbols. The RF transmitter 616 upconverts a baseband signal into an RF signal and transmits the RF signal through an antenna.

Figure 7:
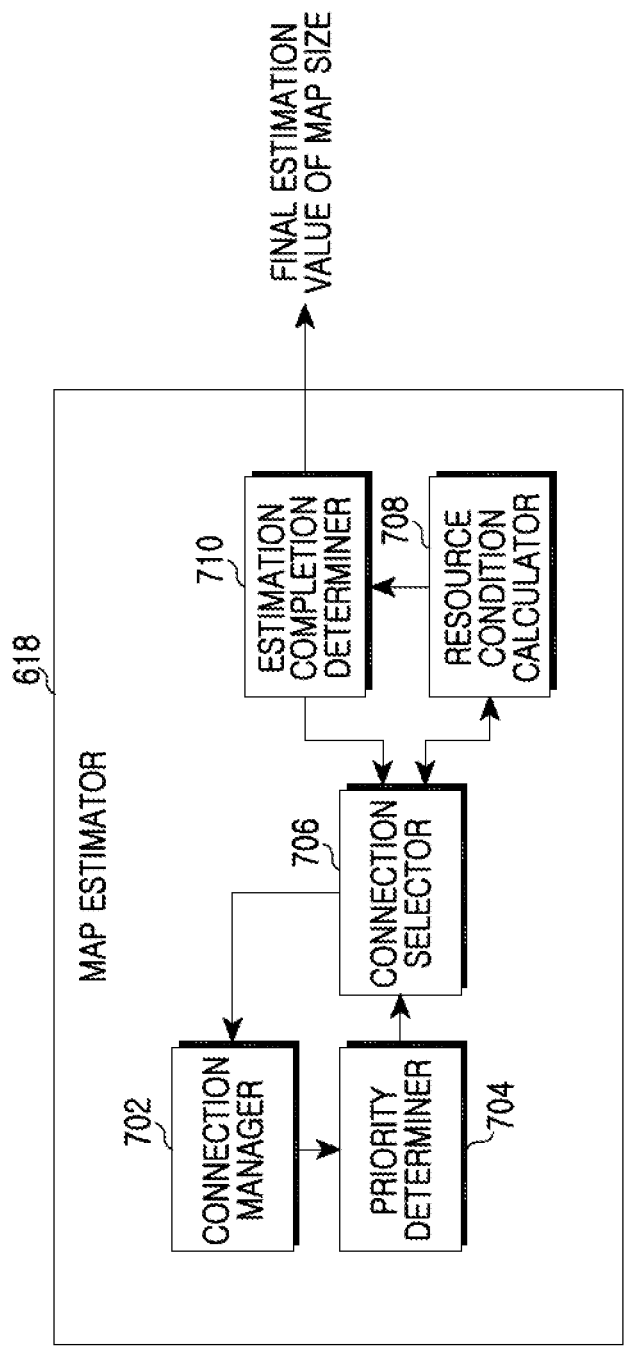
FIG. 7 is a block diagram of a MAP estimator in a broadband wireless communication system according to an exemplary embodiment of the present invention.

FIG. 7 is a block diagram of the MAP estimator 618 in a broadband wireless communication system according to an exemplary embodiment of the present invention. Referring to FIG. 7, the MAP estimator 618 includes a connection manager 702, a priority determiner 704, a connection selector 706, a resource condition calculator 708, and an estimation completion determiner 710.

The connection manager 702 determines the zone type, service type, and MCS level of connections. The connection manager 702 determines the zone type, service type, and MCS level of each connection according to the service characteristics and the characteristics of a user terminal corresponding to each connection. The connection manager 702 performs queue scheduling to determine the priority of each connection for a data burst to be transmitted for each service class. In particular, when receiving a connection change request from the connection selector 706, the connection manager 702 switches a zone of the requested connection and adjusts the MCS level and the service type of the requested connection. The priority determiner 704 determines the priority between connections based on the priority between data bursts according to the queue scheduling. Accordingly, connections to be allocated resources in the current subframe are determined sequentially.

The connection selector 706 selects connections to be considered for MAP size estimation sequentially according to the priority between connections determined by the priority determiner 704. The connection selector 706 selects a connection with the highest priority and provides information about the zone type, service type, MCS level, and transmission data amount of the selected connection to the resource condition calculator 708. When receiving a connection reselection request from the estimation completion determiner, the connection selector 706 selects a connection with the next highest priority. When receiving a connection change request from the estimation completion determiner 710, the connection selector 706 provides information for the connection change to the connection manager 702.

The resource condition calculator 708 determines a MAP size and an available resource condition in consideration of the connection selected by the connection selector 706. The resource condition calculator 708 determines the total number of slots of a region including the selected connection and updates the number of DL subburst IEs or DL MAP IEs for the region including the selected connection. The resource condition calculator 708 determines the number of subchannels of the MAP region, the number of symbols of the MAP region, and the number of data symbols of the MAP region; determines the maximum number of allocatable slots and the number of data symbols of each of a nonsegmented zone and a segmented zone; and determines the total number of slots of the nonsegmented zone and the segmented zone. Thereafter, the resource condition calculator 708 notifies the estimation completion determiner 710 of the total number of data symbols of the nonsegmented zone and the segmented zone, as well as the maximum number of the allocatable slots. If acceptable resources for a burst are not present in the region including the selected connection, the resource condition calculator 708 does not determine an available resource condition and notifies the estimation completion determiner 710 of this determination. According to another exemplary embodiment of the present invention, if acceptable resources are not present in the region including the selected connection, the resource condition calculator 708 determines whether acceptable resources are present in a region not including the selected connection and notifies the estimation completion determiner 710 accordingly.

The estimation completion determiner 710 determines the completion or non-completion of MAP size estimation according to the available resource condition determined by the resource condition calculator 708. If the available resources are present, the estimation completion determiner 710 requests a connection reselection to the connection selector 706. On the other hand, if the available resources are not present, the estimation completion determiner 710 determines the currently determined MAP size as the final estimation value of a MAP size and outputs the final estimation value of the MAP size. According to an exemplary embodiment of the present invention, if the estimation completion determiner 710 is notified of the absence of acceptable resources for the burst in the region including the connection selected, the estimation completion determiner 710 determines the currently determined MAP size as the final estimation value of the MAP size. According to another exemplary embodiment of the present invention, if the estimation completion determiner 710 is notified of the absence of acceptable resources in the region including the connection selected by the connection selector 706 and the presence of acceptable resources in the region not including the selected connection, the estimation completion determiner 710 requests a change of the selected connection from the connection selector 706.

According to another exemplary embodiment of the present invention, if the estimation completion determiner 710 is notified of the absence of acceptable resources for the burst in the region including the connection selected by the connection selector 706 and the presence of acceptable resources in the region not including the selected connection, the estimation completion determiner 710 determines the currently determined MAP size as the final estimation value of the MAP size.

The estimation completion determiner 710 determines the available resource condition by using the maximum number of available slots of the segmented zone and the nonsegmented zone and the total number of slots to be allocated. If the total number of slots to be allocated to the segmented zone is smaller than the maximum number of slots allocatable to the segmented zone or the total number of slots to be allocated to the nonsegmented zone is smaller than the maximum number of slots allocatable to the nonsegmented zone, then the estimation completion determiner 710 determines that the available resources are present. On the other hand, if the total number of slots to be allocated to the segmented zone is greater than or equal to the maximum number of slots allocatable to the segmented zone and the total number of slots to be allocated to the nonsegmented zone is greater than or equal to the maximum number of slots allocatable to the nonsegmented zone, the estimation completion determiner 710 determines that the available resources are not present.

As described above, when a segmented nonHARQ data burst, a segmented HARQ data burst, a nonsegmented non-HARQ data burst, and a nonsegmented HARQ data burst are simultaneously allocated in one frame in a broadband wireless communication system, embodiments of the present invention perform MAP size estimation to estimate the number of data bursts and the size of a MAP to be allocated to the frame, thereby making it possible to improve the data rate without wasting resources. Embodiments of the present invention can also prevent the resources from being wasted because the MAP size becomes greater than the MAP size necessary for the data burst. Embodiments of the present invention can further prevent the resources from being wasted because there is a limitation on the number of allocatable bursts due to a limitation on the MAP size.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A method for estimating a MAP size in a broadband wireless communication system based on Fractional Frequency Reuse (FFR), the method comprising:
  determining by a base station a structure of a first zone and a second zone, the first zone employing a Frequency Reuse Pattern (FRP) greater than one and the second zone employing an FRP equal to one (FRP-1);
  determining service types and Modulation and Coding Schemes (MCSs) for each of candidate connections;
  performing a queue scheduling to determine priorities of the each of candidate connections:
  determining regions for allocation of data bursts to be transmitted: estimating a MAP size: and allocating the data bursts in a burst allocation region of a downlink frame according the priorities,
wherein the estimating of the MAP size comprises:
selecting one of a plurality of connections according to priority between the connections;
determining whether the selected connection is included in the first zone or the selected connection is included in the second zone;
determining an available resource condition and the MAP size for allocation of resources for the selected connection, if resources acceptable for a burst are available in a zone, among the first zone and the second zone, including the selected connection;
determining whether available resources are present or not based on a total number of slots to be allocated to the first zone, a maximum number of slots allocatable to the first zone, a total number of slots to be allocated to the second zone, and a maximum number of slots allocatable to the second zone;
selecting the next connection according to the priority if available resources are present; and
determining the MAP size as a final estimation value of a MAP size if the available resources are not present.

2. The method of claim 1, further comprising: determining a MAP size when not allocating a resource for the selected connection, if the available resources for the burst allocation are not present in the zone including the selected connection.

3. The method of claim 2, wherein the determining of the MAP size and the available resource condition comprises:
determining the total number of slots of a region including the selected connection;
updating a number of downlink subburst Information Elements (IEs) or downlink MAP IEs for the region including the selected connection;
determining a number of data symbols, a number of symbols, and a number of subchannels of the MAP region;
determining a maximum number of allocatable slots and a number of data symbols of each of the first zone and the second zone; and
determining the total number of slots of the second zone and the first zone.

4. The method of claim 3, wherein the determining of whether the available resources are present or not comprises:
determining that the available resources are present when the total number of slots to be allocated to the first zone is smaller than the maximum number of slots allocatable to the first zone, or when the total number of slots to be allocated to the second zone is smaller than the maximum number of slots allocatable to the second zone.

5. The method of claim 3, wherein the determining of whether the available resources are present or not comprises:
determining that the available resources are not present when the total number of slots to be allocated to the first zone is greater than or equal to the maximum number of slots allocatable to the first zone and the total number of slots to be allocated to the second zone is greater than or equal to the maximum number of slots allocatable to the second zone.

6. The method of claim 1, wherein each of the first zone and the second zone is further divided into a Hybrid Automatic Repeat Request (HARQ) burst allocation region and a non-HARQ burst allocation region, and
wherein the determining of the available resource condition further comprises determining whether the resources acceptable for the burst for the selected connection are available in a corresponding HARQ burst allocation region or non-HARQ burst allocation region.

7. A method for estimating a MAP size in a broadband wireless communication system based on Fractional Frequency Reuse (FFR), the method comprising:
determining by a base station a structure of a first zone and a second zone, the first zone employing a Frequency Reuse Pattern (FRP) greater than one and the second zone employing an FRP equal to one (FRP-1);
determines service types and Modulation and Coding Schemes (MCSs) for each of candidate connections;
performing a queue scheduling to determine priorities of the each of candidate connections;
determines regions for allocation of data bursts to be transmitted; estimating a MAP size; and
allocating the data bursts in a burst allocation re~ion of a downlink frame according the priorities,
wherein the estimating of the MAP size comprises:
selecting one of a plurality of connections according to a priority between the connections;
determining an available resource condition and the MAP size for allocation of resources for the selected connection, if resources acceptable for a burst are available in a zone including the selected connection, wherein the zone comprises one of the first zone and the second zone;
determining that acceptable resources for the burst are available in a zone, among the first zone and the second zone, not including the selected connection, switching a zone of the selected connection, and adjusting a Modulation and Coding Scheme (MCS) level and a service type of the selected connection, if the acceptable resources for the burst are not present in the zone including the selected connection;
selecting a next connection according to the priority if the available resources are present; and
determining the MAP size as the final estimation value of a MAP size if the available resources are not present.

8. The method of claim 7, further comprising: determining a MAP size when not allocating a resource for the selected connection, if the resources acceptable for the burst are not present in the zone not including the selected connection.

9. The method of claim 8, wherein the determining of the MAP size and the available resource condition comprises:
determining a total number of slots of a region including the selected connection; updating a number of downlink subburst Information Elements (IEs) or downlink MAP IEs for the region including the selected connection;
determining a number of data symbols, a number of symbols, and a number of subchannels of the MAP region;
determining a maximum number of allocatable slots and a number of data symbols of each of the first zone and the second zone; and
determining the total number of slots of the second zone and the first zone.

10. The method of claim 9, wherein the determining of whether the available resources are present or not comprises:
determining that the available resources are present when the total number of slots to be allocated to the first zone is smaller than the maximum number of slots allocatable to the first zone, or when the total number of slots to be allocated to the second zone is smaller than the maximum number of slots allocatable to the second zone.

11. The method of claim 9, wherein the determining of the MAP size as the final estimation value of a MAP size comprises:
determining that the available resources are not present when the total number of slots to be allocated to the first zone is greater than or equal to the maximum number of slots allocatable to the first zone and the total number of slots to be allocated to the second zone is greater than or equal to the maximum number of slots allocatable to the second zone.

12. The method of claim 7, wherein each of the first zone and the second zone is further divided into a Hybrid Automatic Repeat Request (HARQ) burst allocation region and a non-HARQ burst allocation region, and
wherein the determining of the available resource condition further comprises determining whether the resources acceptable for the burst for the selected connection are available in a corresponding HARQ burst allocation region or non-HARQ burst allocation region.

13. An apparatus for estimating a MAP size in a broadband wireless communication system based on Fractional Frequency Reuse (FFR), the apparatus comprising:
a scheduler for determining a structure of a first zone and a second zone, the first zone employing a Frequency Reuse Pattern (FRP) greater than one and the second zone employing an FRP equal to one (FRP-1), determines service types and Modulation and Coding Schemes (MCSs) for each of candidate connections, performing a queue scheduling to determine priorities of the each of candidate connections, determines regions for allocation of data bursts to be transmitted, estimating a MAP size, and allocating the data bursts in a burst allocation re~ion of a downlink frame according the priorities,
wherein the scheduler comprises:
a selector for selecting one of a plurality of connections according to priority between the connections;
a calculator for determining whether the selected connection is included in the first zone or the selected connection is included in the second zone and for determining an available resource condition and the MAP size for allocation of resources for the selected connection, if acceptable resources for a burst are available in a zone, among the first zone and the second zone, including the selected connection; and
a determiner for determining whether available resources are present or not based on a total number of slots to be allocated to the first zone, a maximum number of slots allocatable to the first zone, a total number of slots to be allocated to the second zone, and a maximum number of slots allocatable to the second zone, and for determining the MAP size as a final estimation value of a MAP size if the available resources are not present,
wherein the selector selects a next connection according to the priority if the available resources are present.

14. The apparatus of claim 13, wherein the determiner determines a MAP size when not allocating a resource for the selected connection, if acceptable resources for the burst are not present in the zone including the selected connection.

15. The apparatus of claim 14, wherein the calculator determines the total number of slots of a region including the selected connection; updates a number of downlink subburst IEs or downlink MAP IEs for the region including the selected connection; determines a number of data symbols, a number of symbols, and a number of subchannels of the MAP region; determines a maximum number of allocatable slots and a number of data symbols of each of the first zone and the second zone; and determines the total number of slots of the second zone and the first zone.

16. The apparatus of claim 15, wherein the determiner determines that the available resources are present when the total number of slots to be allocated to the first zone is smaller than the maximum number of slots allocatable to the first zone, or when the total number of slots to be allocated to the second zone is smaller than the maximum number of slots allocatable to the second zone.

17. The apparatus of claim 15, wherein the determiner determines that the available resources are not present when the total number of slots to be allocated to the first zone is greater than or equal to the maximum number of slots allocatable to the first zone and the total number of slots to be allocated to the second zone is greater than or equal to the maximum number of slots allocatable to the second zone.

18. The apparatus of claim 13, wherein each of the first zone and the second zone is further divided into a Hybrid Automatic Repeat Request (HARQ) burst allocation region and a non-HARQ burst allocation region, and
wherein the determining of the available resource condition further comprises determining whether the resources acceptable for the burst for the selected connection are available in a corresponding HARQ burst allocation region or non-HARQ burst allocation region.

19. An apparatus for estimating a MAP size in a broadband wireless communication system based on Fractional Frequency Reuse (FFR), the apparatus comprising:
a scheduler for determining a structure of a first zone and a second zone, the first zone employing a Frequency Reuse Pattern (FRP) greater than one and the second zone employing an FRP equal to one (FRP-1), determines service types and Modulation and Coding Schemes (MCSs) for each of candidate connections, performing a queue scheduling to determine priorities of the each of candidate connections,
determines regions for allocation of data bursts to be transmitted, estimating a MAP size, and allocating the data bursts in a burst allocation region of a downlink frame according the priorities,
wherein the scheduler comprises:
a selector for selecting one of a plurality of connections according to priority between the connections;
a calculator for determining whether the selected connection is included in a—the first zone or the selected connection is included in the second zone and for determining an available resource condition and the MAP size for allocation of resources for the selected connection, if acceptable resources for a burst are present in a zone, among the first zone and the second zone, including the selected connection;
a connection manager for switching a zone of the selected connection and for adjusting a Modulation and Coding Scheme (MCS) level and a service type of the selected connection when acceptable resources for the burst are not present in the zone including the selected connection and acceptable resources for the burst are present in the zone not including the selected connection; and
a determiner for determining whether available resources are present or not based on a total number of slots to be allocated to the first zone, a maximum number of slots allocatable to the first zone, a total number of slots to be allocated to the second zone, and a maximum number of slots allocatable to the second zone, and for determining the MAP size as the final estimation value of a MAP size if the available resources are not present,
wherein the selector selects the next connection according to the priority if the available resources are present.

20. The apparatus of claim 19, wherein the determiner determines a MAP size when not allocating a resource for the selected connection, if acceptable resources for the burst are not present in the zone not including the selected connection.

21. The apparatus of claim 20, wherein the calculator determines the total number of slots of a region including the selected connection; updates a number of downlink subburst IEs or downlink MAP IEs for the region including the selected connection; determines a number of data symbols, a number of symbols, and a number of subchannels of the MAP region; determines a maximum number of allocatable slots and a number of data symbols of each of the first zone and the second zone; and determines the total number of slots of the second zone and the first zone.

22. The apparatus of claim 21, wherein the determiner determines that the available resources are present when the total number of slots to be allocated to the first zone is smaller than the maximum number of slots allocatable to the first zone or the total number of slots to be allocated to the second zone is smaller than the maximum number of slots allocatable to the second zone.

23. The apparatus of claim 21, wherein the determiner determines that the available resources are not present when the total number of slots to be allocated to the first zone is greater than or equal to the maximum number of slots allocatable to the first zone and the total number of slots to be allocated to the second zone is greater than or equal to the maximum number of slots allocatable to the second zone.

24. The apparatus of claim 19, wherein each of the first zone and the second zone is further divided into a Hybrid Automatic Repeat Request (HARQ) burst allocation region and a non-HARQ burst allocation region, and
wherein the determining of the available resource condition further comprises determining whether the resources acceptable for the burst for the selected connection are available in a corresponding HARQ burst allocation region or non-HARQ burst allocation region.

25. A base station comprising:
a scheduler for determining a structure of a first zone and a second zone, the first zone employing a Frequency Reuse Pattern (FRP) greater than one and the second zone employing an FRP equal to one (FRP-1), determines service types and Modulation and Coding Schemes (MCSs) for each of candidate connections, performing a queue scheduling to determine priorities of the each of candidate connections, determines regions for allocation of data bursts to be transmitted, estimating a MAP size, and allocating the data bursts in a burst allocation region of a downlink frame according the priorities;
a message generator for generating a MAP message detailing the resource allocation of the scheduler;
a data buffer for storing data to be transmitted in a data burst and for outputting the stored data according to the resource allocation of the scheduler; and a transmitter comprising an antenna, for transmitting a radio-frequency message based on the MAP message output from the message generator and/or the data output from the data buffer,
wherein the scheduler allocates resources to user terminals based on the estimated MAP size for allocation of resources to user terminals, the estimated MAP size varying according to available resources in a data burst allocation region of a Downlink (DL) frame,
wherein the data burst allocation region comprises the first and the second zone, and
wherein each of the first zone and the second zone is divided into a Hybrid Automatic Repeat Request (HARQ) burst allocation region and a non-HARQ burst allocation region.

26. The base station of claim 25, wherein the scheduler further comprises: a MAP estimator for estimating the MAP size, the MAP size varying according to available resources; and
a resource allocator to allocate resources to a connection based on the estimated MAP size.

27. The base station of claim 25, further comprising:
an encoder for channel-encoding an information bit stream received from the data buffer and the message generator;
a symbol modulator for modulating the channel-encoded information bit stream into complex symbols;
a subcarrier mapper for mapping the complex symbols to a frequency domain based on the resource allocation of the scheduler; and an OFDM modulator for converting the mapped complex symbols into a time-domain signal and for outputting results of the conversion to the transmitter for transmission.

* * * * *